(12) United States Patent
  Im

(10) Patent No.: US 12,682,524 B2
(45) Date of Patent: Jul. 14, 2026

(54) APPARATUS AND METHOD FOR CREATING VIDEO ON BASIS OF INTERACTIVE NATURAL LANGUAGE PROCESSING

(71) Applicant: Wook Bin Im, Seoul (KR)

(72) Inventor: Wook Bin Im, Seoul (KR)

( * ) Notice: Subject to any disclaimer, the term of this patent is extended or adjusted under 35 U.S.C. 154(b) by 29 days.

(21) Appl. No.: 18/544,045

(22) PCT Filed: May 4, 2022

(86) PCT No.: PCT/KR2022/006393
  § 371 (c)(1),
  (2) Date: Dec. 18, 2023

(87) PCT Pub. No.: WO2023/003141
  PCT Pub. Date: Jan. 26, 2023

(65) Prior Publication Data
  US 2024/0203008 A1  Jun. 20, 2024

(30) Foreign Application Priority Data
  Jul. 20, 2021  (KR) ........................ 10-2021-0094721

(51) Int. Cl.
  G09G 5/00 (2006.01)
  G06F 40/40 (2020.01)
  G06T 11/60 (2006.01)
(52) U.S. Cl.
  CPC .............. G06T 11/60 (2013.01); G06F 40/40 (2020.01)
(58) Field of Classification Search
  CPC ................. G09G 5/14; G09G 2340/10; G09G
  2340/125; G06T 11/60; G06T 15/503;
  G06T 2207/30196; G06T 2207/10016;
  G06T 7/13; G06T 7/50; G06T 2200/24;
  G06T 2207/10024; G06T 2207/20221;
  G06T 11/203; G06T 11/00; G06T 1/60;
  G06T 7/248; G06T 7/74; G06T 5/50;
  (Continued)

(56) References Cited

U.S. PATENT DOCUMENTS 9,020,824 B1  4/2015 Govil
2008/0304808 A1* 12/2008 Newell ............... G11B 27/322
  (Continued)

FOREIGN PATENT DOCUMENTS

JP  202197417 A  6/2021
KR  10-2009-0022786 A  3/2009
  (Continued)

*Primary Examiner* — Gordon G Liu
(74) *Attorney, Agent, or Firm* — PARK LAW FIRM

(57) ABSTRACT

The present disclosure generally relates to a technology of automatically creating a video by performing natural language processing on a scenario that is generally provided by a user. In particular, the present disclosure relates to a technology of automatically creating a video on the basis of interactive natural language processing by dividing a user scenario into a plurality of sections through natural language processing with one or more template video stored for many unit stories, matching and setting a template video to each of the sections in accordance with user's selection, combining a user character created with a picture of the user with each of the template videos, and connecting these template videos.

11 Claims, 7 Drawing Sheets

(58) Field of Classification Search
CPC .......... G06F 3/017; G06F 40/20; G06F 40/40; G06V 20/56; G06V 30/1423; H04N 23/69; H04N 23/60; H04N 21/8545; G02B 27/001; G02B 2027/0138; G02B 2027/014; B25J 9/1689; B25J 9/1697
USPC ....................................................... 345/629
See application file for complete search history.

(56) References Cited

U.S. PATENT DOCUMENTS

| | | | |
|---|---|---|---|
| 2012/0177345 A1* | 7/2012 | Trainer | .......... H04N 21/234336 |
| | | | 704/260 |
| 2014/0205270 A1 | 7/2014 | Kelly et al. | |
| 2018/0091732 A1 | 3/2018 | Wilson et al. | |
| 2020/0051554 A1 | 2/2020 | Kim et al. | |
| 2020/0242964 A1* | 7/2020 | Wu | .......................... G09B 7/02 |
| 2020/0334418 A1 | 10/2020 | Platt et al. | |

FOREIGN PATENT DOCUMENTS

| | | |
|---|---|---|
| KR | 10-1038903 B | 6/2011 |
| KR | 10-1728099 B | 4/2017 |
| KR | 10-2018-0084465 A | 7/2018 |
| KR | 10-2069897 B | 1/2020 |
| KR | 10-2021-0040882 A | 4/2021 |
| KR | 10-2262702 B | 6/2021 |

* cited by examiner

FIG. 3

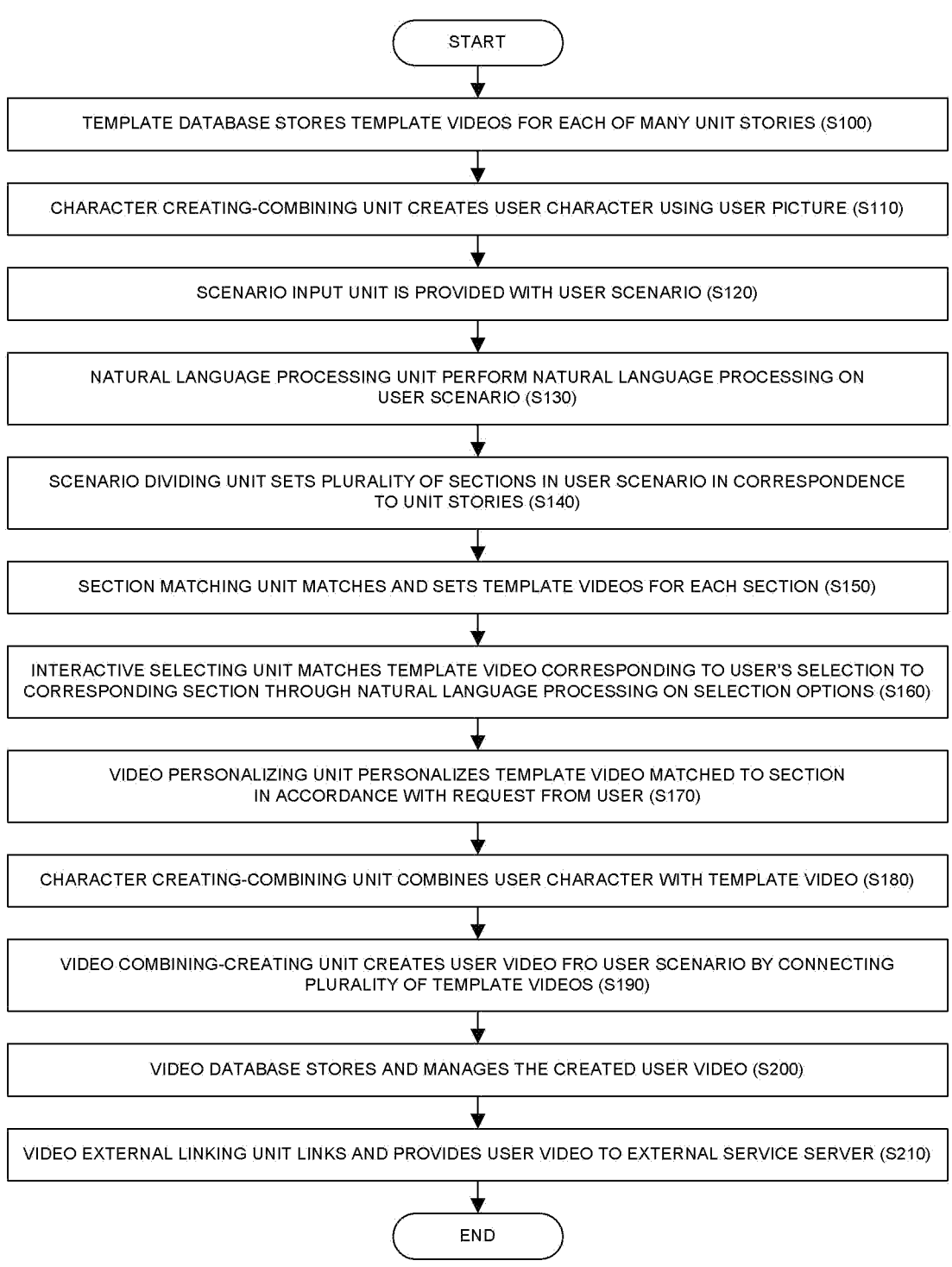

START

TEMPLATE DATABASE STORES TEMPLATE VIDEOS FOR EACH OF MANY UNIT STORIES (S100)

CHARACTER CREATING-COMBINING UNIT CREATES USER CHARACTER USING USER PICTURE (S110)

SCENARIO INPUT UNIT IS PROVIDED WITH USER SCENARIO (S120)

NATURAL LANGUAGE PROCESSING UNIT PERFORM NATURAL LANGUAGE PROCESSING ON USER SCENARIO (S130)

SCENARIO DIVIDING UNIT SETS PLURALITY OF SECTIONS IN USER SCENARIO IN CORRESPONDENCE TO UNIT STORIES (S140)

SECTION MATCHING UNIT MATCHES AND SETS TEMPLATE VIDEOS FOR EACH SECTION (S150)

INTERACTIVE SELECTING UNIT MATCHES TEMPLATE VIDEO CORRESPONDING TO USER'S SELECTION TO CORRESPONDING SECTION THROUGH NATURAL LANGUAGE PROCESSING ON SELECTION OPTIONS (S160)

VIDEO PERSONALIZING UNIT PERSONALIZES TEMPLATE VIDEO MATCHED TO SECTION IN ACCORDANCE WITH REQUEST FROM USER (S170)

CHARACTER CREATING-COMBINING UNIT COMBINES USER CHARACTER WITH TEMPLATE VIDEO (S180)

VIDEO COMBINING-CREATING UNIT CREATES USER VIDEO FRO USER SCENARIO BY CONNECTING PLURALITY OF TEMPLATE VIDEOS (S190)

VIDEO DATABASE STORES AND MANAGES THE CREATED USER VIDEO (S200)

VIDEO EXTERNAL LINKING UNIT LINKS AND PROVIDES USER VIDEO TO EXTERNAL SERVICE SERVER (S210)

END

APPARATUS AND METHOD FOR CREATING VIDEO ON BASIS OF INTERACTIVE NATURAL LANGUAGE PROCESSING

FIELD OF THE INVENTION

The present disclosure generally relates to a technology of automatically creating a video by performing natural language processing on a scenario that is generally provided by a user.

In particular, the present disclosure relates to a technology of automatically creating a video on the basis of interactive natural language processing, by dividing a user scenario into a plurality of sections through natural language processing with one or more template videos stored for many unit stories, matching and setting a template video to each of the sections in accordance with user's selection, combining a user character created with a picture of the user with each of the template videos, and connecting these template videos.

BACKGROUND ART

As smartphones are popularized and the network speed is increased, recently, media-based information is generally used.

In particular, as more and more people use social network services, such as Instagram, Facebook, and Kakao page, and video services such as YouTube, users actively use videos for the purpose of expressing themselves, advertising products, etc.

However, it is not simple for regular people to create a video with their desired content. It may be possible to film everyday life of an individual or events using smartphone cameras, but it is difficult to create a video having content over a predetermined level.

In order to create such videos, it is required to search for a place, cast people, take videos at several angles, and then edit the videos and add special effects. However, skilled techniques and creation experiences and various items of hardware and software are required to perform such work, which makes the job impossible for regular people. People who necessarily need such videos to advertise companies, events, and products ask specialized companies with considerable costs.

It is definitely the trend of the times to distribute information on the basis of media on the internet. Accordingly, there is a need for a technology that enables regular people to simply create video with a story over a predetermined level easier than now.

Meanwhile, prior art documents relating to the present disclosure are as follows.

(1) Korean Patent No. 10-1038903 (May 30, 2011), "System for creation of moving picture contents"
(2) Korean Patent No. 10-2262702 (Jun. 3, 2021), "System for creating video using change pattern of shot"
(3) Korean Patent No. 10-2069897 (Jan. 17, 2020), "Method for generating user video and apparatus therefor"
(4) Korean Patent Application Publication No. 10-2021-0040882 (Apr. 14, 2021), "Method and apparatus for generating video"

DISCLOSURE OF INVENTION

Technical Problem

An objective of the present disclosure is to provide a technology of automatically creating a video by performing natural language processing on a scenario that is generally provided by a user.

In particular, an objective of the present disclosure is to provide a technology of automatically creating a video on the basis of natural language processing, by dividing a user scenario into a plurality of sections through natural language processing with one or more template videos stored for many unit stories, matching and setting a template video to each of the sections in accordance with user's selection, combining a user character created with a picture of the user with each of the template videos, and connecting these template videos.

Technical Solution

In order to achieve the objectives of the present disclosure, an apparatus for creating a video on the basis of interactive natural language processing according to the present disclosure includes: a template database 101 of storing one or more template videos for each of many unit stories; a natural language processing unit 120 of performing natural language processing; a scenario input unit 130 of receiving a user scenario; a scenario dividing unit 140 of setting a plurality of section in correspondence to unit stories by analyzing the user scenario through natural language processing of the natural language processing unit 120; a section matching unit 150 of matching and setting one or more template videos stored in the template database 101 to each of the plurality of sections by the unit stories; an interactive selecting unit 160 of proposing selectable options for sections matched with a plurality of template videos and performing natural language processing on the user's answer thereto, thereby matching and setting a template video corresponding to the user's selection to a corresponding section; and a video combining-creating unit 180 of creating a user video for the user scenario by connecting a plurality of template videos respectively matched and set to the plurality of sections.

The apparatus for creating a video according to the present disclosure may further include a video personalizing unit 170 of personalizing template videos matched to the sections by changing the template videos in accordance with requests from a user in cooperation with the interactive selecting unit 160.

The apparatus for creating a video according to the present disclosure may further include a character creating-combining unit 110 of creating a user character using a user picture provided from a user and combining the user character with the template video.

Further, the template database 101 may be configured to store a plurality of complex elements matched with a combination of a plurality of items of division information and template videos for the unit stories. In this configuration, the interactive selecting unit 160 may be configured, when the complex element corresponds to the section, to propose a plurality of items of division information included in the complex element to a user through a user terminal 200 and match and set a template video connected to the division information selected by the user to a corresponding section.

The apparatus for creating a video according to the present disclosure may further include: a video database 120 of storing and managing a user video created by the video combining-creating unit 180; and a video external linking unit 190 of linking and providing various user videos stored in the video database 102 to an external service server 300 or a user terminal 200.

Further, in order to achieve the objectives of the present disclosure, a method for creating a video on the basis of interactive natural language processing according to the present disclosure includes: a first step in which a template database 101 stores one or more template videos for each of many unit stories; a second step in which a scenario input unit 130 is provided with a user scenario; a third step in which natural language processing unit 120 performs natural language processing on the user scenario; a fourth step in which a scenario dividing unit 140 sets a plurality of sections in correspondence to the unit stories by analyzing the user scenario by the natural language processing; a fifth step in which a section matching unit 150 matches and sets one or more template videos stored in the template database 101 to each of the plurality of sections by the unit stories; a sixth step in which an interactive selecting unit 160 proposes selectable options for sections matched with a plurality of template videos and performs natural language processing on a user's answer thereto, thereby matching and setting a template video corresponding to user's selection to a corresponding section; and a seventh step in which a video combining-creating unit 180 creates a user video for the user scenario by connecting a plurality of template videos respectively matched and set to the plurality of sections.

The method for creating a video according to the present disclosure may further include a step in which a video personalizing unit 170 personalizes template videos matched to the sections by changing the template videos in accordance with requests from a user in cooperation with the interactive selecting unit 160.

The method for creating a video according to the present disclosure may further include: a step in which a character creating-combining unit 110 creates a user character using a user picture provided from the user; and a step in which the character creating-combining unit 110 combines the user character with template videos matched and set to the plurality of sections.

Further, the first step may include a step in which the template database 101 stores a plurality of complex elements matched with a combination of a plurality of items of division information and template videos for the unit stories. In this case, the sixth step may include: a step in which when the complex element corresponds to the section, the interactive selecting unit 160 proposes a plurality of items of division information included in the complex element to a user through a user terminal 200; a step in which the interactive selecting unit 160 identifies division information selected by the user from the proposed plurality of items of division information; and a step in which the interactive selecting unit 160 matches and sets a template video connected to the selected division information to a corresponding section.

Meanwhile, a computer program according to the present disclosure is stored in a storage medium to perform the method for creating a video on the basis of interactive natural language processing described above in a computer.

Advantageous Effects

According to the present disclosure, there is an advantage that regular people can conveniently create a video having a story over a predetermined level.

Further, the present disclosure has an advantage of assisting regular people to be able to create a video having a story expressing themselves by themselves and upload the video to Instagram, Facebook, Kakao page, and YouTube, etc.

Further, according to the present disclosure, there is an advantage that it is possible to improve flexibility and variety in creating a video by performing natural language processing on a scenario provided by a user in an interactive manner and then applying the scenario to creation of a video.

BRIEF DESCRIPTION OF THE DRAWINGS

FIG. 3 is a block diagram showing the entire process of a method for creating a video on the basis of interactive natural language processing according to the present disclosure;

EMBODIMENT FOR CARRYING OUT THE INVENTION

The present disclosure is described hereafter in detail with reference to the drawings.

Figure 1:
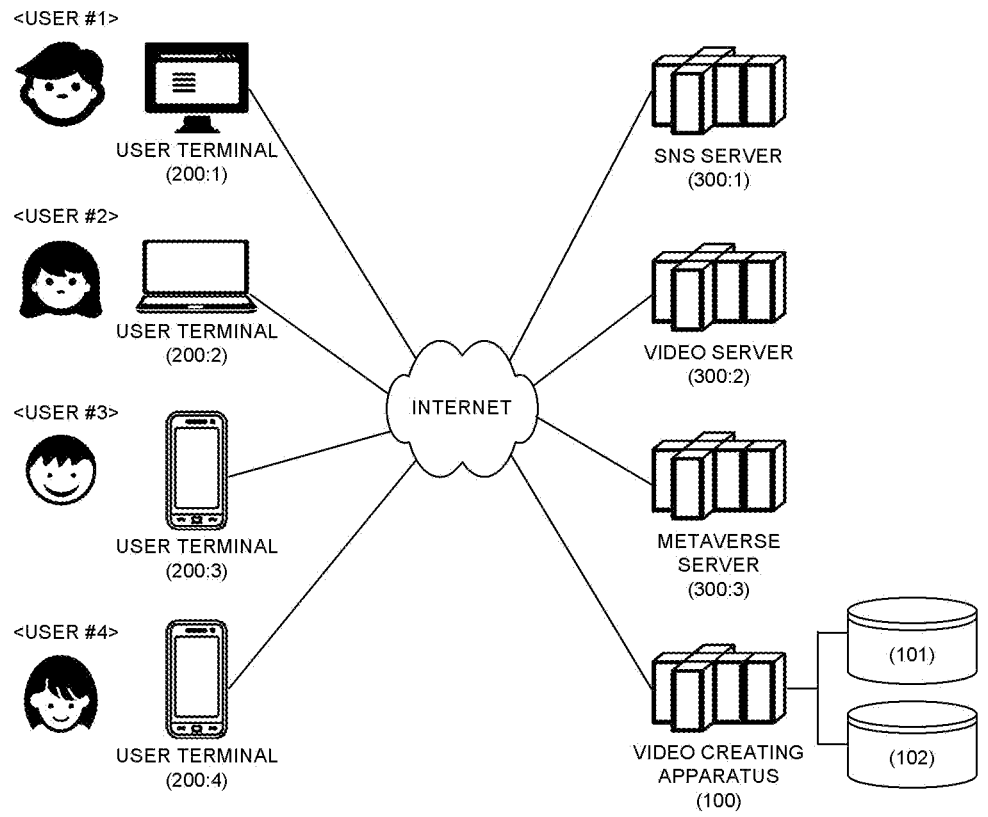
FIG. 1 is a diagram showing a concept of automatically creating a video by the present disclosure.

FIG. 1 is a diagram showing a concept of automatically creating a video by the present disclosure.

In the present disclosure, a video creating apparatus 100 is connected with many user terminals 200 through the internet. Accordingly, the apparatus is provided with a scenario and picture of a user from the user and receives several selection inputs, thereby automatically creating a video according to the scenario. The video creating apparatus 100 creates a video using materials stored in a template database 101 and stores the created video in a video database 102.

The video creating apparatus 100 generally provides the created video to the user providing the corresponding scenario through downloading. Depending on embodiments, the video creating apparatus 100 may provide the created video to an external service server 300 in accordance with a request from the user. In this case, the video can be used for a social network service (SNS), a video service, a metaverse service, etc.

Figure 2:
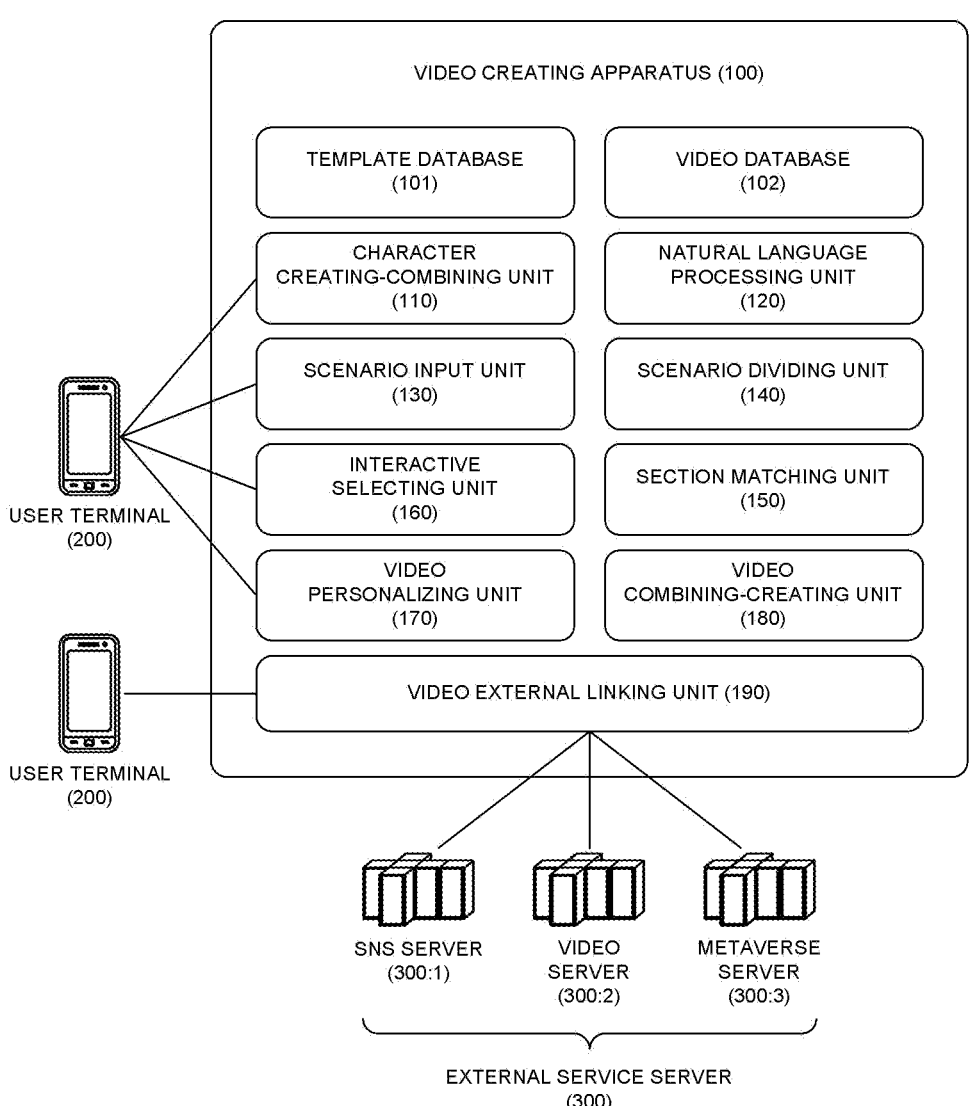
FIG. 2 is a block diagram showing the entire configuration of an apparatus for creating a video on the basis of interactive natural language processing according to the present disclosure.

FIG. 2 is a block diagram showing the entire configuration of the video creating apparatus 100 on the basis of interactive natural language processing according to the present disclosure.

Referring to FIG. 2, the video creating apparatus 100 on the basis of interactive natural language processing according to the present disclosure includes a template database 101, a natural language processing unit 120, a scenario input unit 130, a scenario dividing unit 140, a section matching unit 150, an interactive selecting unit 160, a video personalizing unit 170, a video combining-creating unit 180, a video database 102, and a video external linking unit 190.

First, the template database 101 is a component that stores one or more template videos for each of many unit stores.

The 'unit story', which is wording that is a fundamental unit creating a video, may be set in various ways depending on implementation of the present disclosure. For example, 'clouds float in the sky, 'walking on the street', 'driving a car', etc. may be unit stories.

Figure 4:
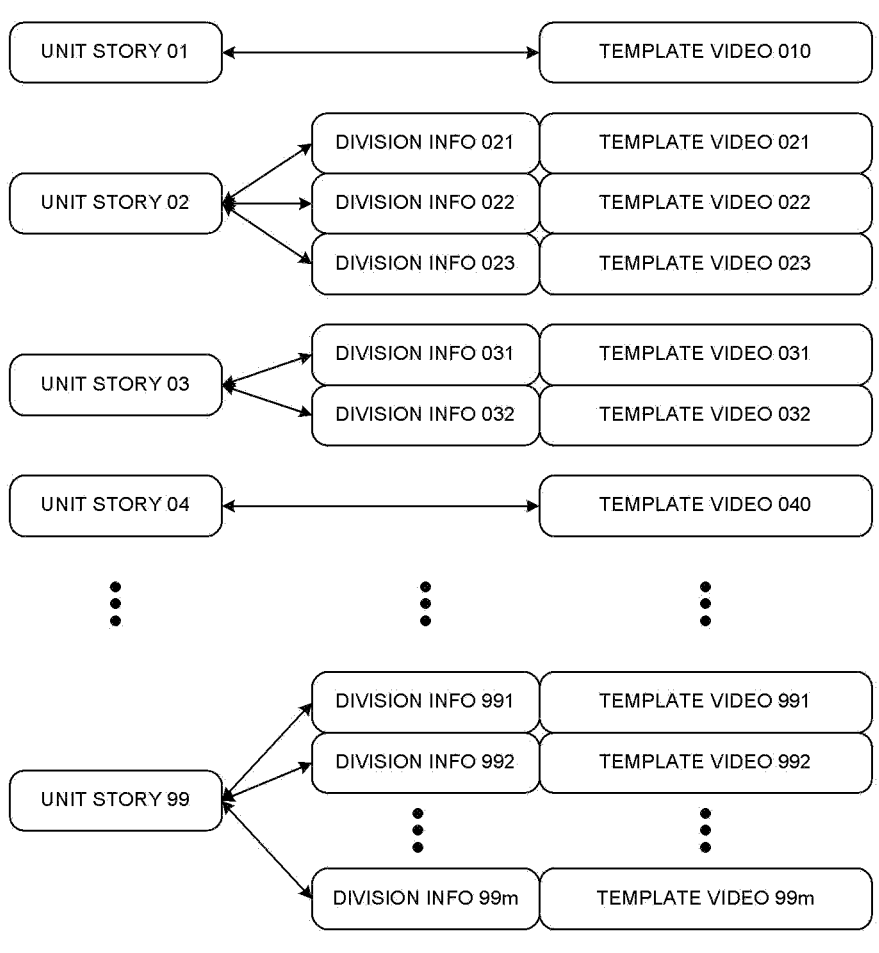
FIG. 4 is a diagram showing a concept in which template videos are stored respectively for unit stories in a template database in the present disclosure.

FIG. 4 is a diagram showing a concept in which template videos are stored respectively for unit stories in the template database 101 in the present disclosure.

One, or two or more template videos correspond to each unit story in the template database 101. Referring to FIG. 4, one template video 010 corresponds to a unit story 01 and three template videos 021, 022, and 023 correspond to a unit story 02.

In this specification, the item in which one template video is matched to a unit story one-to-one is called a simple element. In FIG. 4, the items related to the unit stories 01 and 04 are simple elements. Further, an item in which a combination of a plurality of items of division information and template videos are matched to a unit story is called a complex element. In FIG. 4, the items related to the unit stories 02, 03, and 99 are complex elements.

In a complex element, division information is matched to each template video. This division information corresponds to variants for the corresponding unit story. For example, when the unit story 02 is 'clouds float in the sky', the division information 021 may be 'dark cloud', the division information 022 may be 'cirrus', and the division information 023 may be 'cumulus'. In this case, the template video 021 is an image with dark clouds in the sky, the template video 022 is an image with cirri in the sky, and the template video 023 is an image with cumuli in the sky. Preferably, many combinations of such unit stories and template videos are stored in the template database 101. In particular, it is preferable that complex elements are provided in the template database 101 to create various types of videos.

Meanwhile, the template videos may be actually taken real images or may be 3D computer graphic images created through rendering by a Unity engine or an Unreal engine.

A character creating-combining unit 110 is a component that creates a user character using a user picture provided from a user and combines the user character with a template video. For example, when a user takes a picture of his/her face and uploads the picture using a smartphone, a character for the user is created. It is possible to create a story video that can effectively express the user by combining the user character with a video.

A user character is created for an actually taken video using computer software, for example, a Unity engine or an Unreal engine.

Meanwhile, when there is a unit that sets the owner of a video in another way, the character creating-combining unit 110 may not be provided. However, when it is possible to set a character in a user's video using a picture (video) of the user through the character creating-combining unit 110, it would be possible to greatly improve satisfaction of the user.

The natural language processing unit 120 is a component for performing natural language processing (NLP). The natural language processing technique is well known in the art and the present disclosure does not relate to natural language processing itself, so it is not described in detail.

The scenario input unit 130 is a component that receives a user scenario. A user scenario, which describes the content of a user's desired video in a text, may be uploaded from a user terminal 200 or may be transmitted through another server device.

The scenario dividing unit 140 is a component that divides a user scenario in accordance with content by applying natural language processing on the user scenario through the natural language processing unit 120. That is, when a user scenario suitable for a video of a quantity of 10 minutes is input, the user scenario is divided into 50 pieces. As an embodiment for automatic processing through a computer unit, the scenario dividing unit 140 analyzes a user scenario and sets a plurality of sections in correspondence to unit stories.

In this case, since a scenario made by a person is formed in various formats, which are difficult to predict, rather than a predetermined format, it is difficult to expect the scenario to accurately coincide with pre-prepared unit stories. Comparison in forms based on a text is not suitable for the present disclosure, and user scenario and unit stories have to be compared in accordance with content. Accordingly, natural language processing is required in the present disclosure.

Figure 5:
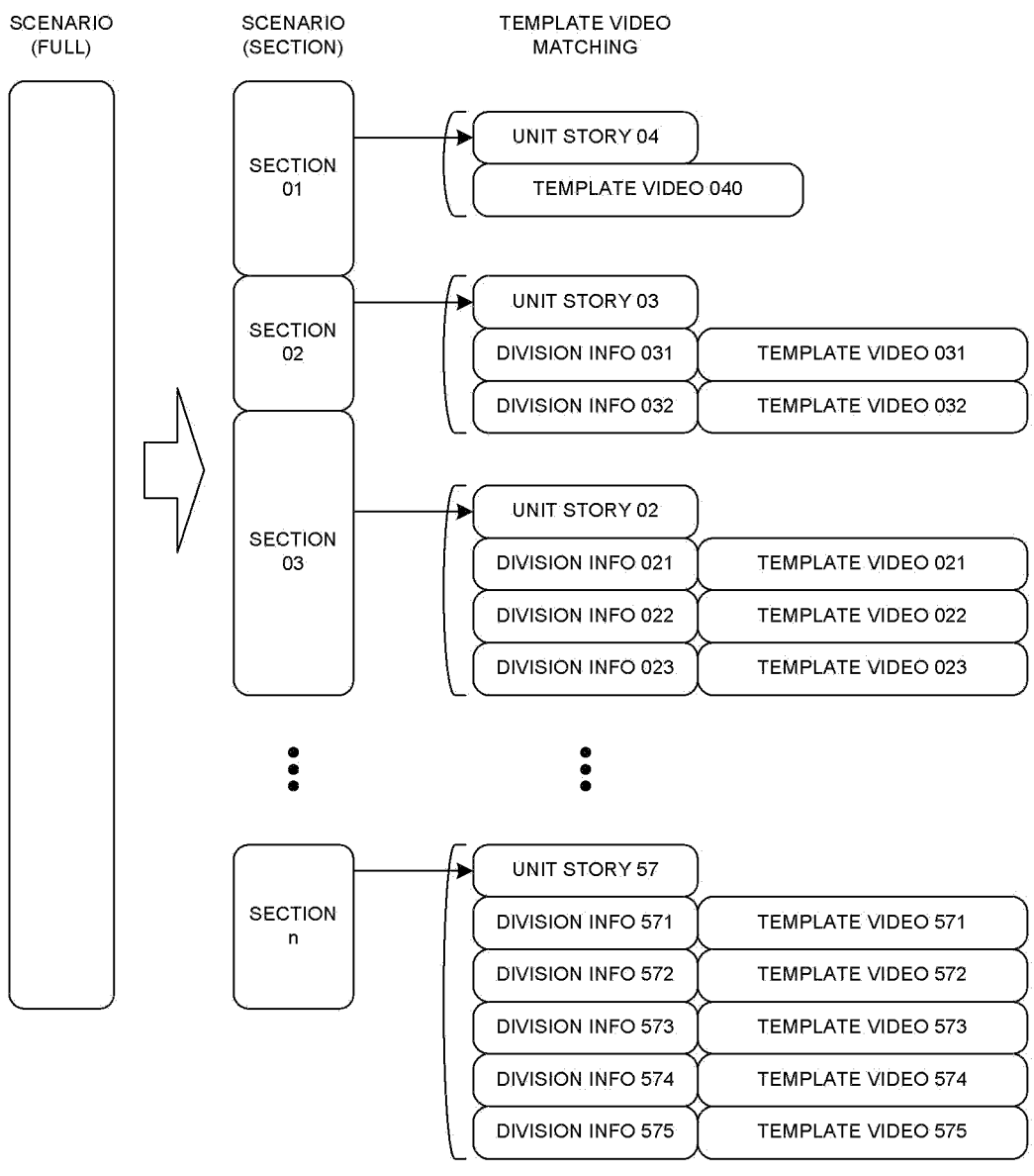
FIG. 5 is a diagram showing a concept of dividing a scenario in the present disclosure.

FIG. 5 is a diagram showing a concept of dividing a scenario in the present disclosure. Natural language analysis was applied to the full user scenario, n sections corresponding to pre-stored unit stories were found on the basis of keywords included in the scenario, and the scenario was divided into n sections.

The section matching unit 150 analyzes content by performing natural language processing on a plurality of sections and searches for matchable unit stories from the template database 101. As a result, the section matching unit 150 is a component that matches and sets template videos stored in the template database 101 respectively for a plurality of sections on the basis of unit stories.

Referring to FIG. 5, the section 01 has content corresponding to the unit story 04, so the template video 040 is matched and set. Further, the section 02 has content corresponding to the unit story 03, and accordingly, template videos 031 and 032 are matched and set. In this way, one or more template videos are matched and set for each section on the basis of unit stories.

The interactive selecting unit 160 is a component that proposes selectable options for sections matched with a plurality of template videos and performs natural language processing on the user's answer thereto, thereby matching and setting a template video corresponding to the user's selection to a corresponding section.

Figure 6:
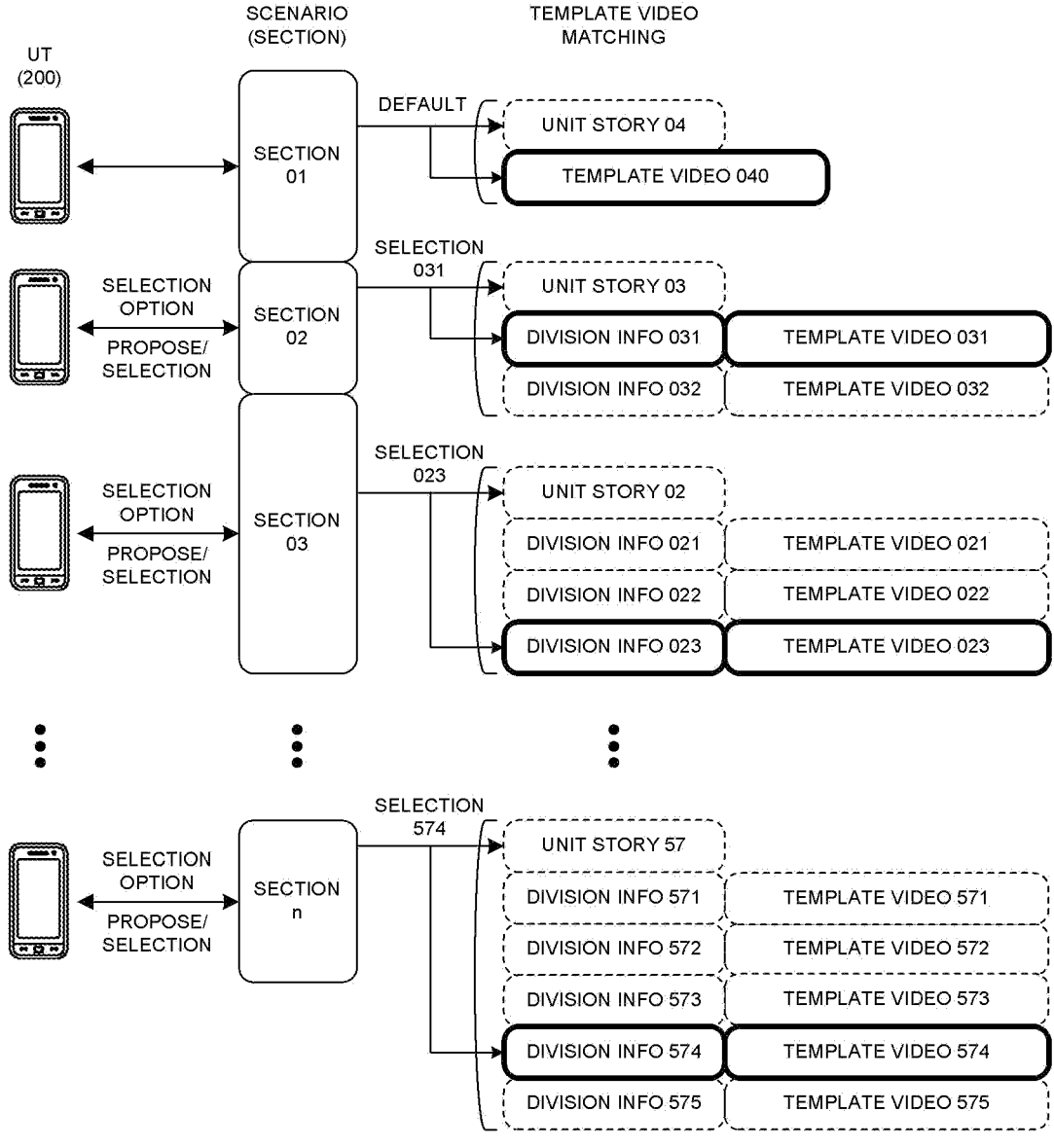
FIG. 6 is a diagram showing the concept of interactive processing in the present disclosure.

FIG. 6 is a diagram showing the concept of interactive processing in the present disclosure. For example, as for the section 03, three template videos 021, 022, and 023 are matched and set to the section 03. That is, according to the above description about the template database 101, it is the case in which a complex element corresponds to a section.

In this case, a plurality of items of division information included in the complex element is proposed to the user through the user terminal 200 and corresponding user's selection is received. For example, 'dark cloud' that is the division information 021, 'cirrus' that is the division information 022, and 'cumulus' that is the division information 023 are displayed on the user terminal 200, and user's selection for the items of division information is received. In this case, when the user selects any one item of division information, for example, the 'cumulus' that is the division information 023, the interactive selecting unit 160 matches and sets the template video 023 connected to the selected division information, that is, an 'image with cumuli in the sky' to the section 03.

The video personalizing unit 170 personalizes template videos matched to sections by changing them in accordance with requests from a user in cooperation with the interactive selecting unit 160.

Template videos stored in advance in the template database 101 may not suit user's taste. Template videos may not sufficiently show delicate phrases described in a user scenario and more delicate expressions may be added in a user interaction process. It is possible to increase satisfaction for the quality of videos by making up for this problem.

Accordingly, the video personalizing unit 170 performs natural language processing on a user scenario or a user's answer and applies the result of natural language processing, thereby changing a template video.

For example, the case where the unit story 03 of the section 03 was "light clouds with a hint of purple" is considered. The three template videos 021, 022, and 023 matched to the section 03 are videos corresponding to 'dark cloud', 'cirrus', and 'cumulus'. In this case, the video personalizing unit 170 can change the template videos of the template videos 021, 022, and 023 to correspond to "with a hint of purple" and "light".

As another example, the case where the template video 023, that is, an 'image with cumuli in the sky" is matched and set to the section 03 by the interactive selecting unit 160 is considered. A user may want the change the matched and set template video 023. In this case, the user may answer a question from the video creating apparatus 100 about whether there are any changes, for example, "clouds with a hint of purple" and "light clouds" through a text. The video personalizing unit 170 can change the template video 023 to correspond to "with a hint of purple" and "light".

To this end, the video personalizing unit 170 may be configured to perform natural language processing on a user scenario or a user's answer, compare the result of natural language processing and the division information of a corresponding template video, extracts matters not in the division information from the result of natural language processing, and change the template video in accordance with the extracted content. As an embodiment, this process may be performed by software using a unity engine, an unreal engine, or the like. In this case, it is possible to store many material images (e.g., purple clouds) in the template database 101 and use them for personalizing.

Meanwhile, it may be possible personalize one or more template videos matched to each section by the section matching unit 150 or personalize final template videos matched and set to each section by the interactive selecting unit 160.

Figure 7:
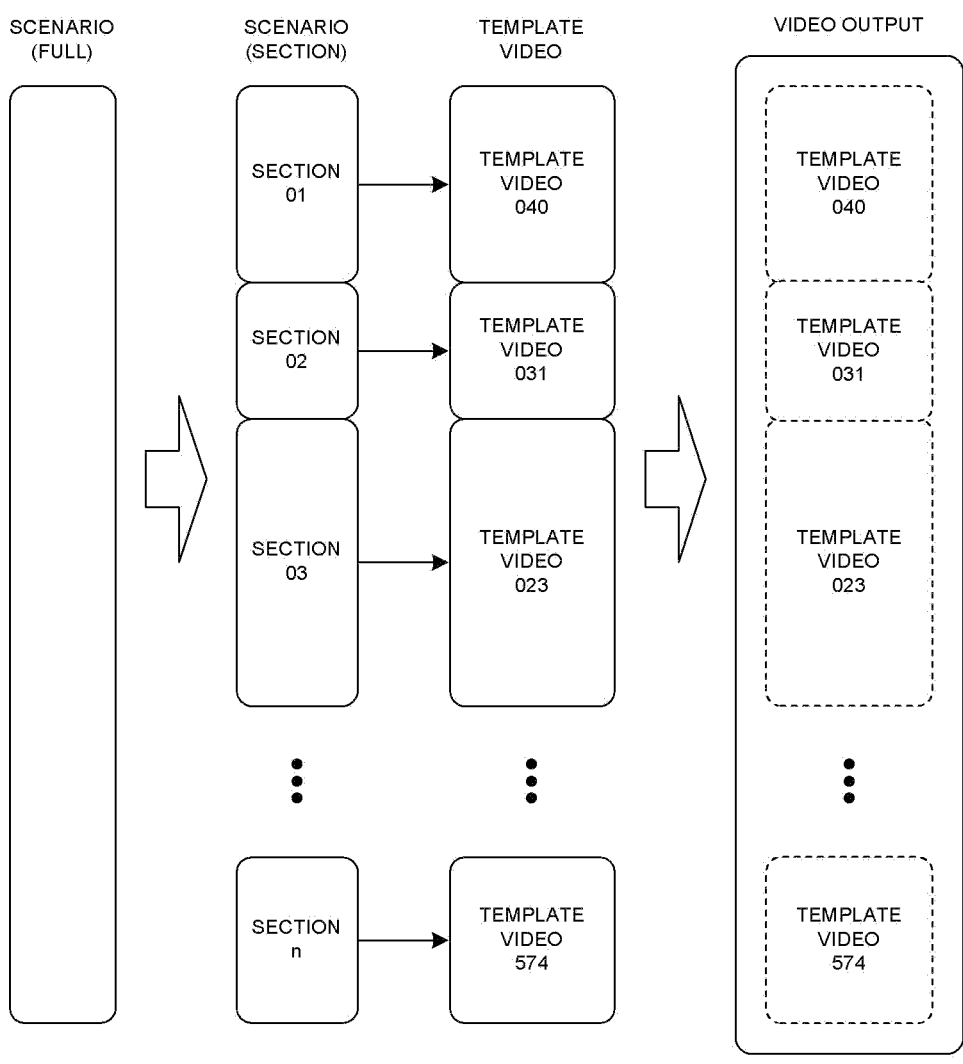
FIG. 7 is a diagram conceptually showing the configuration of a video created by dividing a scenario in the present disclosure.

The video combining-creating unit 180 is a component that creates a user video for a user scenario by connecting a plurality of template videos respectively matched and set to a plurality of sections. FIG. 7 is a diagram conceptually showing the configuration of a video created by dividing a scenario in the present disclosure. One video is created by connecting a plurality of template videos.

The video database 102 is a component that stores and manages a user video created by the video combining-creating unit 180 temporarily or for a long period.

The video external linking unit 190 is a component that links and provides various user videos stored in the video database 102 to the external service server 300 or the user terminal 200. In this case, downloading may be provided or only a URL may be provided. Through the linkage of videos to the outside, it is possible to use a user video created by the present disclosure for services such as an SNS, a video service, a music video service, company advertisement, individual advertisement, and a metaverse. Depending on embodiments, it is possible to connect and provide advertisement content stored in the video creating apparatus 100 itself with a user video.

FIG. 3 is a block diagram showing the entire process of a method for creating a video on the basis of interactive natural language processing according to the present disclosure.

Since the technical configuration of the present disclosure was described in detail in relation with the apparatus for creating a video, a processing process is briefly described hereafter.

Step S100: First, the template database 101, as shown in FIG. 4, prepares and stores in advance one or more template videos for each of many unit stories.

Step S110: The character creating combining unit 110 creates a user character using a user's picture (video) through a unity engine, an unreal engine, or the like.

Step S120: The scenario input unit 130 is provided with a user scenario.

Step S130 and S140: The natural language processing unit 120 performs natural language processing on the user scenario.

The scenario dividing unit 140 analyzes the user scenario obtained through natural language processing by the natural language processing unit 120, thereby setting a plurality of sections for the user scenario in correspondence to unit stories, as shown in FIG. 5.

Step S150: The section matching unit 150, as shown in FIG. 5, matches and sets one or more template videos stored in the template database 101 to each of a plurality of sections by unit stories.

Step S160: The interactive selecting unit 160, as shown in FIG. 6, proposes selection options to the user for the sections having a plurality of template videos matched, and performs natural language processing on a user's answer to the options, thereby matching and setting a template video corresponding to the user's selection to a corresponding section.

Describing the process in detail, when a complex element corresponds to a section, a plurality of items of division information included in the complex element is proposed to the user through the user terminal 200, division information selected by the user from the proposed plurality of items of division information is identified, and the template video connected to the selected division information is matched and set to the corresponding section.

Step S170: The video personalizing unit 170 personalizes template videos matched to sections by changing them in accordance with requests from a user in cooperation with the interactive selecting unit 160. That is, the video personalizing unit 170 performs natural language processing on a user scenario or a user's answer and applies the result of natural language processing, thereby changing a template video.

In this case, personalization may be performed on one or more template videos matched to each section by the section matching unit 150 or may be performed on final template videos matched and set to each section by the interactive selecting unit 160.

Step S180: The character creating-combining unit 110 combines a user character with the template video matched and set to the plurality of sections.

Step S190: The video combining-creating unit 180, as shown in FIG. 7, connects a plurality of template videos respectively matched and set to the plurality of sections, thereby creating a user video for the user scenario.

Step S200 and S210: The video database 102 stores and manages the created user video temporarily or for a long period. The video external linking unit 190 links and provides the user video in the video database 102 to the external service server 300 or the user terminal 200, whereby it is possible to use a user video created by the present disclosure for services such as an SNS, a video service, a music video service, company advertisement, individual advertisement, and a metaverse.

Meanwhile, the present disclosure can be implemented in the form of computer-readable codes in a computer-readable non-volatile recording medium. As such computer-readable non-volatile recording medium, there are various types of storage devices, for example, a hard disk, an SSD, a CD-ROM, a NAS, a magnetic tape, a web disc, a cloud disc, etc., and codes may be distributed, stored, and executed in many storage devices connected through a network. Further, the present disclosure may be implemented in the type of a computer program stored in a medium to be connected to hardware and to execute a specific procedure.

The invention claimed is:

1. An apparatus for creating a video based on interactive natural language processing, comprising:
  a template database configured to store one or more template videos for each of a plurality of unit stories, wherein the template database is further configured to store a plurality of complex elements, each complex element comprising a combination of a plurality of items of division information and specific template videos matched to a single unit story;
  a natural language processing (NLP) unit configured to perform natural language processing;
  a scenario input unit configured to receive a user scenario;
  a scenario dividing unit configured to divide the user scenario in accordance with content through natural language processing performed by the natural language processing unit into a plurality of sections in correspondence to the unit stories;
  a section matching unit configured to match and set at least one template video stored in the template database to each of the plurality of sections by the unit stories;
  an interactive selecting unit configured to, when a complex element corresponds to a specific section: propose the plurality of items of division information included in the complex element to a user terminal; perform natural language processing on a natural language answer received from the user terminal in response to the proposed items; and identify and set a specific template video connected to the division information selected by the user to the specific section; and
  a video combining-creating unit configured to create a user video for the user scenario by connecting a plurality of template videos respectively matched and set to the plurality of sections.

2. The apparatus of claim 1, further comprising:
  a video personalizing unit configured to personalize the template videos matched to the sections by: extracting content, which is not present in the division information, from a result of the natural language processing of the user scenario or the user's natural language answer; and changing a visual attribute of the template video to correspond to the extracted content in cooperation with the interactive selecting unit.

3. The apparatus of claim 1, further comprising:
  a character creating-combining unit configured to create a user character using a user picture provided by the user and to combine the user character with the template video.

4. The apparatus of claim 1, further comprising:
  a video database configured to store and manage the user video created by the video combining unit; and
  a video external linking unit configured to provide the user video stored in the video database to an external service server or the user terminal.

5. The apparatus of claim 1, wherein the division information comprises of one or more of an image with dark clouds in the sky, an image with cirri in the sky, or an image with cumuli in the sky.

6. The apparatus of claim 1, wherein the division information comprises of an image with dark clouds in the sky, an image with cirri in the sky, and an image with cumuli in the sky.

7. A method for creating a video based on interactive natural language processing, the method comprising:
  storing, in a template database, one or more template videos for each of a plurality of unit stories, wherein the template database stores a plurality of complex elements matched with a combination of a plurality of items of division information and template videos for the unit stories;
  receiving a user scenario through a scenario input unit;
  performing natural language processing on the user scenario through a natural language processing (NLP) unit;
  dividing the user scenario in accordance with content into a plurality of sections in correspondence to the unit stories based on a result of the natural language processing;
  matching at least one template video stored in the template database to each of the plurality of sections by the unit stories;
  when a complex element corresponds to a section, identifying selected division information by: presenting the plurality of items of division information to a user terminal; processing a natural language answer received from the user terminal; and setting a template video connected to the identified division information to the corresponding section; and
  generating a user video for the user scenario by connecting the template videos respectively matched to the plurality of sections.

8. The method of claim 7, further comprising:
  personalizing, by a video personalizing unit, the template videos matched to the sections by changing the template videos in accordance with a user request in cooperation with the interactive selecting unit.

9. The method of claim 7, further comprising:
  generating, by a character generation unit, a user character using a user image provided by the user; and
  combining the user character with the template videos matched to the plurality of sections.

10. The apparatus of claim 7, wherein the division information comprises of one or more of an image with dark clouds in the sky, an image with cirri in the sky, or an image with cumuli in the sky.

11. A non-transitory computer-readable recording medium having recorded thereon computer-executable instructions that, when executed by a computer, cause the computer to perform a method for creating a video on the basis of interactive natural language processing, the method comprising:
  storing, in a template database, one or more template videos for each of a plurality of unit stories, wherein the template database stores a plurality of complex elements matched with a combination of a plurality of items of division information and template videos for the unit stories;
  receiving a user scenario through a scenario input unit;
  performing natural language processing on the user scenario through a natural language processing unit;

dividing the user scenario in accordance with content into a plurality of sections in correspondence to the unit stories based on a result of the natural language processing;

matching at least one template video stored in the template database to each of the plurality of sections by the unit stories;

when a complex element corresponds to a section, identifying selected division information by: presenting the plurality of items of division information to a user terminal; processing a natural language answer received from the user terminal; and setting a template video connected to the identified division information to the corresponding section; and generating a user video for the user scenario by connecting the template videos respectively matched to the plurality of sections.

* * * * *